US006211875B1

(12) United States Patent
Lin et al.

(10) Patent No.: US 6,211,875 B1
(45) Date of Patent: Apr. 3, 2001

(54) DISPLAY TEMPLATE SETTING METHOD IN A MULTIMEDIA SYNCHRONOUS TRAINING SYSTEM

(75) Inventors: Benjamin Lin; Ming-Shing Su; Chung-Chih Lin, all of Taipei; Chien-Hung Yang, Yi Lan, all of (TW)

(73) Assignee: Infopower Taiwan Corporation, Taipei (TW)

( * ) Notice: Subject to any disclaimer, the term of this patent is extended or adjusted under 35 U.S.C. 154(b) by 0 days.

(21) Appl. No.: 09/115,742

(22) Filed: Jul. 15, 1998

(30) Foreign Application Priority Data

Jul. 16, 1997 (TW) ................................................ 86110112

(51) Int. Cl.⁷ ..................................................... G09G 5/00
(52) U.S. Cl. ......................... 345/347; 345/340; 345/302; 345/328
(58) Field of Search ..................................... 345/334, 333, 345/347, 352, 354, 340–342, 355, 975, 33.9, 302, 328

(56) References Cited

U.S. PATENT DOCUMENTS 4,570,217 * 2/1986 Allen et al. ............................ 700/83
5,511,157 * 4/1996 Wang ................................... 345/355
5,579,466 * 11/1996 Habib et al. .......................... 345/340
5,684,259 * 11/1997 Horii ..................................... 84/667
5,745,710 * 4/1998 Clanton et al. ...................... 345/349

OTHER PUBLICATIONS

Edward J. Coburn, "Visual Basic Made Easy", PWS Publishing Company, pp. 89–130, 1995.*

Alan Simpson, "Windows 95 Uncut", IDG Books, pp. 537–560, 1995.*

* cited by examiner

Primary Examiner—Raymond J. Bayerl
Assistant Examiner—Thomas J Joseph

(57) ABSTRACT

A display template setting method in a multimedia synchronous system is disclosed. The method includes, first, displaying predetermined display template models, each including various areas; and selecting one of the predetermined display template models. Next, at least one projecting area having three-dimensional characteristics is set in the predetermined display template model. The positions and scales of the various areas corresponding to the selected display template model are calculated; and the various areas are displayed according to the calculated positions and scales and the setting of the projecting area.

6 Claims, 3 Drawing Sheets

DISPLAY TEMPLATE SETTING METHOD IN A MULTIMEDIA SYNCHRONOUS TRAINING SYSTEM

BACKGROUND OF THE INVENTION

1. Field of the Invention

The present invention relates to a multimedia synchronous training system, and more particularly, to an adaptive display template setting method for the multimedia synchronous training or presentation system.

2. Description of the Prior Art

The advent of computer and communication brings a lot of information distributed by books, articles, audio and video media. People would get lost in this information era without a suitably auxiliary tool to efficiently learn knowledge from the information. One of the suitably auxiliary tools exists in the art is the multimedia training or presentation system.

Conventional multimedia system provides a teaching/learning environment. For example, a user can self-learn a subject through manipulating a multimedia course before his or her computer. However, one disadvantage of the conventional multimedia training systems is its inflexibility of display template setting on screen. Specifically, the display template setting is almost fixed, so that the use of the multimedia training course becomes inconvenient or time wasting. Even the display template setting is changeable, the changing or setting procedure is, nevertheless, not flexible enough, or is not humanized by making it more suitable and pleasant for people. For example, left-handers usually have trouble manipulating those tools provided in the multimedia course.

For the foregoing reasons, there is a need for an adaptive setting method for the multimedia system, so that the display template or user interface on the screen is humanized adaptively and flexibly, making it more suitable and pleasant for user to enhance the learning efficiency.

SUMMARY OF THE INVENTION

In accordance with the present invention, a method is provided for adaptively and flexibly setting the display template or user interface of a multimedia training system, so that user can efficiently use the multimedia training course executed on the system according to his or her personal need. In one embodiment, predetermined display template models are displayed when a user clicks the template setting button; and one of the predetermined display template models is selected by the user, whereby adaptively fitting the selected display template model to a user. Next, at least one projecting area or floating window having three-dimensional characteristics is set in the predetermined display template model. The positions of the various areas corresponding to the selected display template model are recalculated for screen displaying; and the various areas are displayed according to the calculated positions and the setting of the projecting area.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
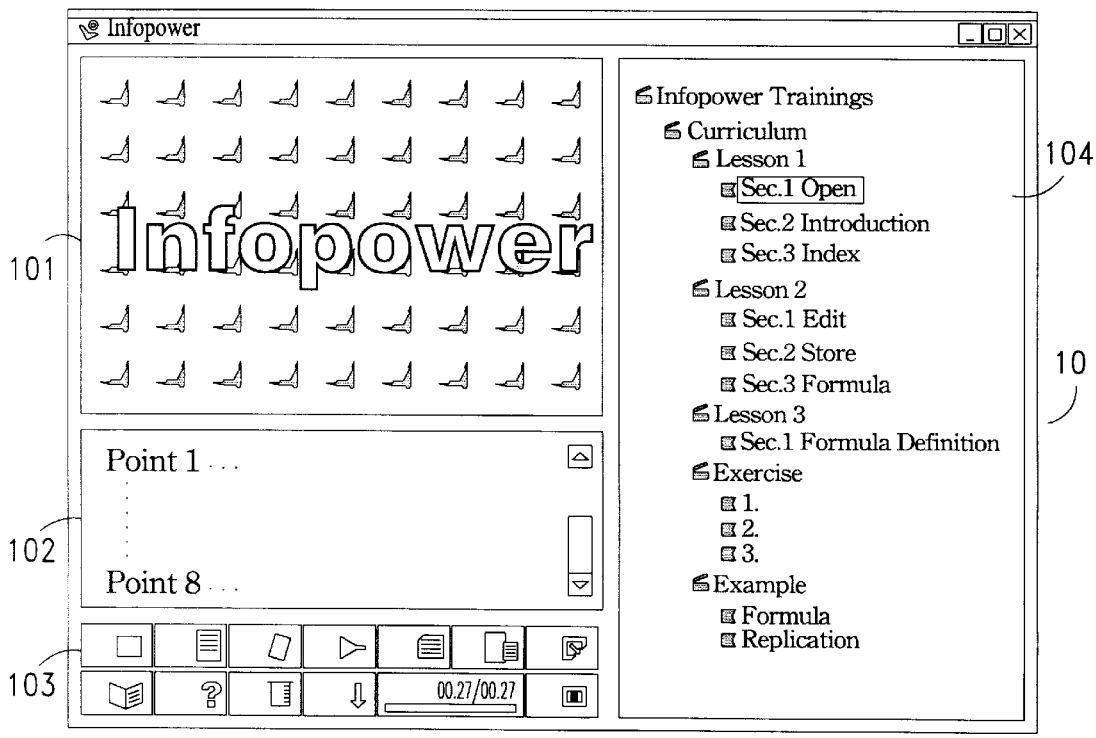
FIG. 1 illustrates an interface of a multimedia synchronous training system according to one embodiment of the present invention.

FIG. 1 illustrates an exemplary interface 10 of a multimedia synchronous training system according to one embodiment of the present invention. The term "synchronous" is used here for demonstrating that different functions or information, such as material presentation, note comments or remarks, or texts of the emphasis presentation, in the multimedia training course of the system can display and serve simultaneously. In the interface 10, there are a window 101 for presenting or broadcasting video contents of the training course materials, and another window 102 for showing corresponding texts of the emphasis, which are displayed synchronously in time with the training course materials presenting. Control window 103 provides miscellaneous control panels, such as pause, rewind, display template setting, bookmark setting, index searching, or replication. Further, window 104 is used as a working area. For example, the contents of the training course materials could be shown in this working window 104; or a word processor could be executed in this area, facilitating the user to note comments or remarks or copy the emphasis in the window 101 or 102. In the present embodiment, the course materials of the multimedia training course can be preferably prerecorded and then stored in a suitable video format, and the texts of the emphasis can be preferably derived from the course materials and then stored in a text format.

Figure 2:
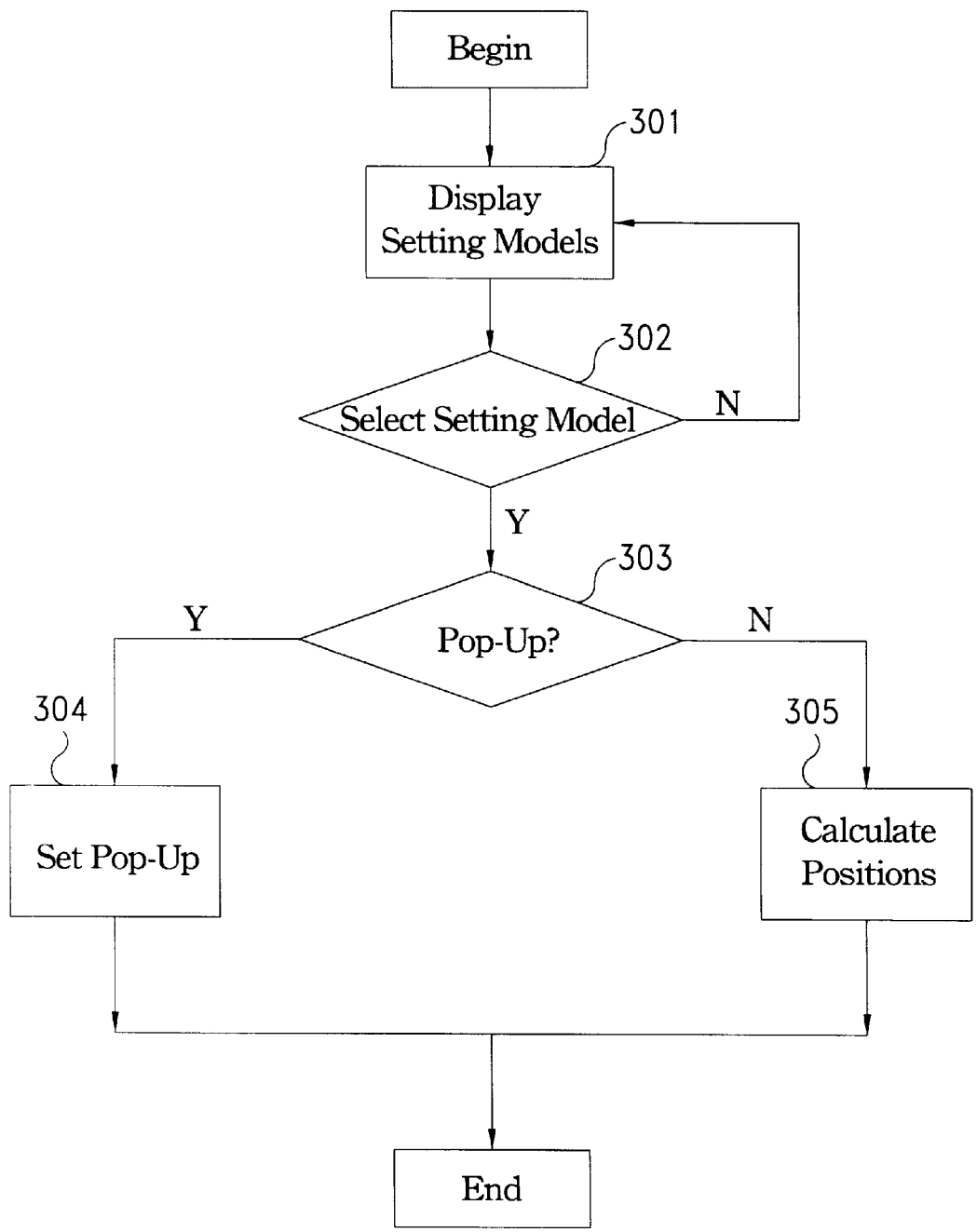
FIG. 2 shows a flow diagram illustrating the various steps of the display template setting in the multimedia synchronous training system.

FIG. 2 shows a flow diagram illustrating the various steps of the display template setting in the multimedia synchronous training system. In the step 301, a plurality of various predetermined display template models, which are pre-stored in a data base, are shown on a pop-out menu of the screen when a user clicks a template setting button in window 103. Next, in the step 302, one of the provided display template models can be selected according to the personal need of the user, making it more suitable and pleasant for the user. For example, left-handers would select a display template model, in which the working window 104 locates on the left side and another windows locate on the right side. If none of the shown display template models approaches the user's personal need, more display template models can be shown by scrolling down the pop-out menu. Moreover, another feature of the display template models is its capability of showing one or more projecting areas (or floating windows), which are displayed in three-dimensional manner. In this embodiment, the area or window to be projected is correspondingly labeled "UP" in that area. For the multimedia training system, when the selected template model is detected as containing projecting area or areas (step 303), the labeled area is then set or drew in three-dimensional manner (step 304). The generation of the projecting area could be done by a suitable conventional software technique. When the selected display template model is detected as not containing projecting area, the predetermined various areas or windows are then displayed on the screen according to their predetermined locations. Finally, the multimedia training system recalculates the positions of the various display areas on the screen (step 305). The display template setting or user interface on the screen is thus humanized adaptively and flexibly, making it more suitable and pleasant for people, and the individual user can efficiently use the multimedia training course executed on the system according to his or her personal need.

Figure 3:
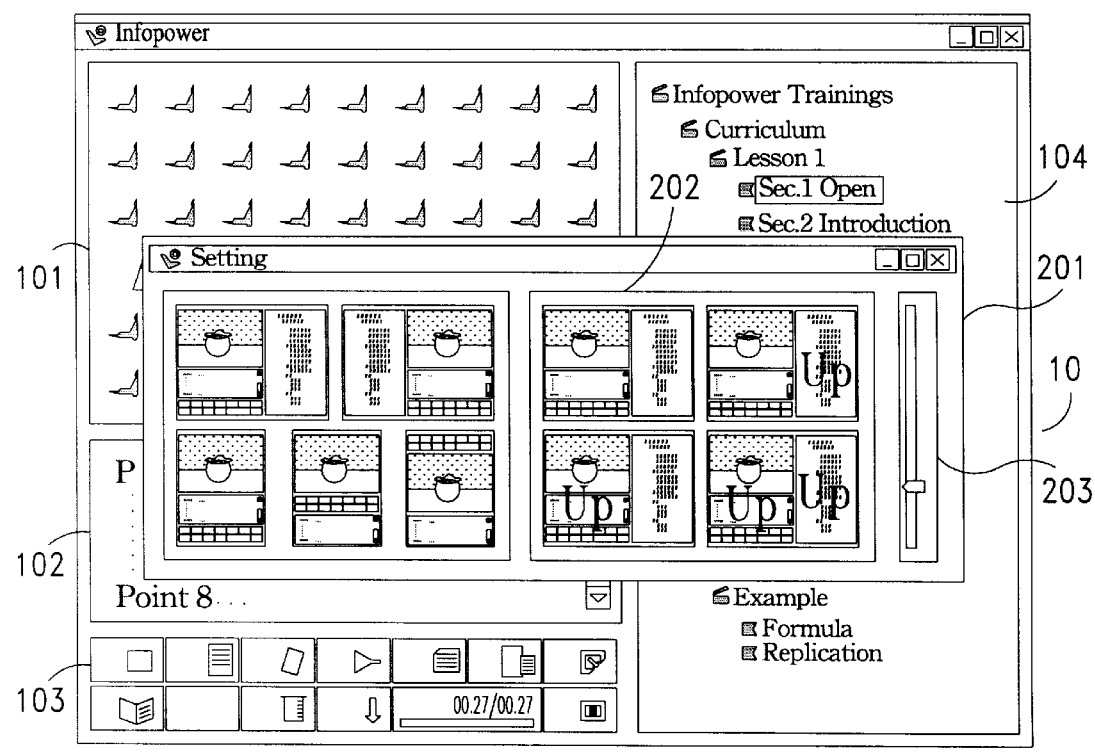
FIG. 3 shows an exemplary interface illustrating the display template setting in the multimedia synchronous training system.

FIG. 3 shows an exemplary interface illustrating the display template setting in the multimedia synchronous training system. After the user clicks an icon or button in the control window 103, a pop-out menu 201 shows up, which corresponds to the step 301 in FIG. 2. This pop-out menu 201 includes many display template models 202, and a scroll bar 203 for showing additional display template models 202. The user selects one of these display template models according to personal need or favorite, which corresponds to the step 302 in FIG. 2. If none of the shown display template models approaches the user's personal need, more display template models can be further shown by dragging down the scroll bar 203. After one display template model 202 is selected, the multimedia training system detects whether the selected model contains a projecting area (the step 303 in FIG. 2) labeled "UP" inside the area. In the case of display template model containing projecting area, the labeled area is then set or drew in three-dimensional manner (the step 304 in FIG. 2); otherwise, the predetermined various areas are then displayed on the screen according to their predetermined location in a one-dimensional fashion. Generally, the projecting area and the non-projecting area are respectively processed, and are then displayed on a different display plane. Finally, the multimedia training system calculates the positions of the various display areas on the screen (the step 305 in FIG. 2) according to the selected display template model. The predetermined display template model is displayed on the screen according the calculated positions and scales of various display areas. The projecting area or floating window increases the visual effect which can enhances the learning efficiency.

According to the embodiment of the present invention, a user can easily change the display template setting or user interface of the multimedia training system according to personal need. The display template setting or user interface on the screen is thus humanized adaptively and flexibly, making it more suitable and pleasant for people, and the individual user can efficiently use the multimedia training course executed on the system according to his or her personal need or favorite.

Although specific embodiments have been illustrated and described, it will be obvious to those skilled in the art that various modifications may be made without departing from what is intended to be limited solely by the appended claims.

What is claimed is:

1. A display template setting method in a multimedia synchronous training system, comprising:

displaying a plurality of predetermined display template models when a user clicks a template setting button, each of said predetermined display template models including a plurality of windows;

selecting one of said plurality of predetermined display template models;

detecting whether said selected predetermined display template model including at least one projecting window;

setting said projecting window having three-dimension characteristics when said selected predetermined display template model includes at least one projecting window;

calculating positions and scales of said plurality of windows on a screen corresponding to said selected predetermined display template model; and displaying said plurality of windows according to said calculated positions and scales of said selected predetermined display template model.

2. The method according to claim 1, wherein each of said predetermined display template models has a different arrangement of said plurality of windows from another.

3. The method according to claim 1, wherein portion of said plurality of predetermined display template models are displayed in a pop-out menu, and the other portion of said plurality of predetermined display template models being further displayed by dragging a scroll bar.

4. The method according to claim 1, wherein said plurality of windows are grouped into a first group and a second group.

5. The method according to claim 4, wherein said first group of said plurality of windows includes at least one projecting window, said at least one projecting window displaying a three-dimension visual effect to said user.

6. The method according to claim 4, wherein said second group of said plurality of windows is displayed with a different display plane on said screen from said first group.

* * * * *